United States Patent
De-Levie et al.

(10) Patent No.: US 10,437,831 B2
(45) Date of Patent: Oct. 8, 2019

(54) IDENTIFYING INSIDER-THREAT SECURITY INCIDENTS VIA RECURSIVE ANOMALY DETECTION OF USER BEHAVIOR

(71) Applicant: EMC IP Holding Company LLC, Hopkinton, MA (US)

(72) Inventors: Yaron De-Levie, Kfar Yehoshua (IL); Ori Mendelson, Tel Aviv (IL); Idan Peretz, Tel Aviv (IL); Sagi Hilleli, Rishon Letzion (IL); Guy Eisenkot, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 279 days.

(21) Appl. No.: 15/068,590

(22) Filed: Mar. 13, 2016

(65) Prior Publication Data
US 2017/0126710 A1    May 4, 2017

Related U.S. Application Data

(60) Provisional application No. 62/247,820, filed on Oct. 29, 2015.

(51) Int. Cl.
*G06F 16/2457*    (2019.01)
*H04L 29/06*    (2006.01)
*G06F 16/28*    (2019.01)

(52) U.S. Cl.
CPC ...... *G06F 16/24575* (2019.01); *G06F 16/285* (2019.01); *H04L 63/1425* (2013.01)

(58) Field of Classification Search
CPC ......... G06F 17/30528; G06F 17/30598; H04L 63/1425
USPC ........................................... 726/23
See application file for complete search history.

(56) References Cited

U.S. PATENT DOCUMENTS

| | | | |
|---|---|---|---|
| 9,177,344 B1* | 11/2015 | Singh | G06F 16/335 |
| 2009/0060352 A1* | 3/2009 | Distante | A63B 24/0021 382/224 |
| 2012/0158360 A1* | 6/2012 | Cammert | G06Q 10/20 702/179 |
| 2013/0138428 A1* | 5/2013 | Chandramouli | G06F 17/274 704/9 |

(Continued)

*Primary Examiner* — Ashokkumar B Patel
*Assistant Examiner* — William B Jones
(74) *Attorney, Agent, or Firm* — Ryan, Mason & Lewis, LLP

(57) ABSTRACT

A computerized system for recursively detecting anomalies in monitored behavior of entities. The system comprises a storage unit to store monitored events, event deviations and parameters related to each event and to each event deviation. The system comprises a processing unit configured to receive a plurality of input events, construct a plurality of baseline models, receive an input event that occurred during an analyzed timeframe, compare parameters of the received input event to a corresponding baseline model in order to detect an event deviation, and associate an event deviation score to the detected event deviation. Using the detected event deviation as an input event, said operations are repeated until a predetermined condition is satisfied, and an alert is generated, indicating suspicious activity has been detected. A viewer application configured to receive and display alerts relating to the detected event deviation is provided.

20 Claims, 6 Drawing Sheets

(56) References Cited

U.S. PATENT DOCUMENTS

2015/0269494 A1* 9/2015 Kardes ................ G06F 16/285
706/12
2015/0355957 A1* 12/2015 Steiner ............... G06F 11/0772
714/37

* cited by examiner

IDENTIFYING INSIDER-THREAT SECURITY INCIDENTS VIA RECURSIVE ANOMALY DETECTION OF USER BEHAVIOR

BACKGROUND OF THE INVENTION

About 20 years ago, Internet Security was introduced to the world by opening and connecting personal, business, education, government and other computing devices from across the world in a global, single network. This act created new and multiple attack vectors that enabled Internet and/or Cyber criminals to intrude upon online assets and to penetrate corporate infrastructure and illegally obtain corporate and personal assets.

In recent years there have been multiple public incidents of big security breaches in which corporate and personal data was stolen, and the damage was substantial. A cyber-attack may include two stages: a) obtaining corporate credentials, either by attacking the corporate, by stealing from personal equipment, or just by paying an internal employee to perform tasks for the use and/or benefit of an attacker, and b) using the obtained credentials to perform the crime, steal corporate confidential files, extract end-customers personal and financial data, embed illegal software, monitor internal activities and report externally and more.

Numerous approaches and technologies for combating the internet security problem were developed, e.g., network based gateways were developed to prevent malware from penetrating the organization, and malware identifications products. This approach is still the main portion of all security technologies and is somewhat successful. In parallel, hardware and software developers invested to increase the underlying security assurances of computation platforms and applications, making software more secure by design.

Security Information Management Systems (SIEM), e.g., IBM® Security QRadar® SIEM, McAfee Enterprise Security Manager, HP ArcSight ESM SIEM, RSA Security Analytics, Splunk® Log Management, target collection of logs of almost every activity in an organization, correlation of these logs, and provide an analytics layer based on predetermined rules, customer-developed rules, integrations with other security systems, security incident investigation tools, etc.

In the last few years, 'cyber security' breaches became more prevalent, by attackers acquiring valid corporate credentials. A cyber-attack can be achieved either by social engineering, by simply paying for the credentials, by paying someone who has corporate credentials to serve the attacker's needs. Corporates started protecting against attacks performed by using obtained credentials internally, by targeting to harvest all log files that are collected at the corporate level, and instead of employing static rule-based technologies, employing anomaly detection algorithms based on machine-learning, data-mining, artificial-intelligence and similar. These anomaly detection algorithms are based on identifying a misuse of valid corporate credentials by identifying deviations of normal behaviors of the valid owners of the credentials. If the attacker, or the valid user in the name of the attacker, is performing harmful operations, these can be identified by detecting a deviation from the normal operation patterns of that user.

Most user-behavior analysis solutions have a common flow. The logs that contain events or occasions, which include a name and an associated value, are obtained from log repositories and are manipulated to create a more uniform and correlated layer of events with additional contextual data that is added to parameters of the events.

However, due to the large variance between people, the present rule-based user-behavior analysis solutions provide an unmanageable amount of suspected anomalies. For example, in a corporate of 1000 employees, a user behavior analysis system may provide thousands of daily alerts of suspicious events detected in the logs. The amount of data cannot be handled by a security expert who is required to check each suspicious event. Thus, a more efficient solution is required, which will provide manageable results and will alert selected suspicious events that are not necessarily rule-based.

SUMMARY

A computerized system for detecting anomalies, for example recursively, in monitored behavior of entities may comprise a storage unit to store monitored events, event deviations and parameters related to each event and to each event deviation. The system may further comprise a processing unit configured to receive a plurality of input events, each input event may comprise a predefined set of parameters. The processing unit may be further configured to construct a plurality of baseline models, each baseline model representing a behavior of at least a subset of parameters of the received input events.

The processing unit may be further configured to receive an input event that occurred during an analyzed timeframe. The processing unit may be further configured to compare parameters of the received input event to a corresponding baseline model in order to detect an event deviation. The processing unit may associate an event deviation score to the detected event deviation and use the detected event deviation as an input event. The system may recursively repeat a set of one or more operations until a predetermined condition is satisfied.

The system may generate alerts indicating suspicious activity has been detected for a specified entity and a specified timeframe associated with the detected event deviation. The system may comprise a viewer application configured to receive alerts relating to one or more detected event deviations and to display said alerts to a user of the viewer application on a display unit.

A system for detecting anomalies in monitored behavior of entities may comprise a processing unit which may be configured to receive a plurality of event deviations and associated event deviation scores that were determined for a baseline time period, each event deviation comprising a predefined set of parameters. The processing unit may be further configured to construct event deviation baseline models, each event deviation baseline model representing a behavior of a subset of selected parameters of the received event deviations. The processing unit may be further configured to receive an event deviation that occurred during an analyzed timeframe and to compare parameters of the event deviation to a corresponding event deviation baseline model in order to detect event anomalies, each event anomaly comprising one or more parameters. An event anomaly score may be associated to each detected event anomaly, and alerts indicating suspicious activity has been detected for a specified entity and a specified timeframe associated with the detected event anomaly may be generated. A viewer application may be configured to receive alerts relating to the detected event anomalies, and to display said alerts to a user of the viewer application on a display unit.

The processing unit may be configured to receive a plurality of event anomalies and associated event anomaly scores that were determined for the baseline time period, each event anomaly may comprise a predefined set of parameters and a specified timeframe. The processing unit may obtain an analyzed timeframe, a specified entity and a context feature set which may comprise plurality of context features. Each context feature may be based on at least one parameter derived from the event anomaly. The processing unit may be further configured to generate a reduced feature set from the context feature set and to calculate an aggregated anomaly value per specified entity per specified timeframe based on the reduced context feature set. The processing unit may be further configured to generate a set of aggregated anomaly values per specified entity per specified timeframe.

The processing unit may be further configured to receive a plurality of aggregated anomaly values that were determined during the baseline time period, wherein each aggregated anomaly value may be calculated based on context features per a specified timeframe. The processing unit may be further configured to construct an anomaly baseline model and to receive new aggregated anomaly values calculated for a specified timeframe. The processing unit may be further configured to compare the new aggregated anomaly values to the anomaly baseline model in order to identify an aggregated anomaly value deviation, wherein the aggregated anomaly value deviation may comprise an entity and a specified timeframe. The processing unit may be further configured to generate an alert indicating suspicious activity detected for the specified entity during the specified timeframe.

The processing unit may be configured to generate said reduced context feature set from the context feature set by calculating a correlation measure for every pair of context features in the context feature set, defining a distance function between any two context features to determine correlating context features and performing a clustering algorithm to group correlating context features. The analyzed timeframe may be selected from the group consisting of sessions, minutes, hours, days and months.

A context feature of the context feature set may be calculated based on at least one of following parameters: a number of events detected during a specified timeframe which include the context feature, a function of the context feature score in the specified timeframe, a number of a distinct occurrences in the specified timeframe, a number of a values measured for the context feature during the specified timeframe, a number of a new values measured for the context feature during the specified timeframe, a parameter type, a correlation measure between the context feature and another context feature, and a score calculated based on a stability over time of context features.

A context feature of the context feature set may be calculated based on received event data, a level of correlation between two or more context features and on the stability over time of context features. For example, determining a correlation between two or more context features in the context feature set may comprise generating a correlation measure between the two or more context features based on the baseline time period and determining a strength of the correlation. Correlating context features may be grouped into clusters by calculating a distance function based on a correlation measure and using the distance function to perform a clustering algorithm on the set of context features.

A computerized method is disclosed for recursively detecting anomalies in monitored behavior of entities which may comprise storing, in a storage unit, monitored events, event deviations and parameters related to each event and to each event deviation. The method may comprise receiving, by a processing unit, a plurality of input events, each input event comprising a predefined set of parameters. The method may comprise constructing, by the processing unit, a plurality of baseline models, each baseline model representing a behavior of at least a subset of parameters of the received input events.

The method may comprise receiving, by the processing unit, an input event that occurred during an analyzed timeframe and comparing, by the processing unit, parameters of the received input event to a corresponding baseline model in order to detect an event deviation. The method may further comprise associating, by the processing unit, an event deviation score to the event deviation detected and using the detected event deviation as an input event. In one embodiment, the method may recursively repeat operations until a predetermined condition may be satisfied.

The method may comprise generating, by the processing unit, alerts to indicate suspicious activity has been detected for an entity and a timeframe associated with the detected event deviation. The method may comprise receiving alerts, by a viewer application, relating to one or more detected event deviations, and displaying, by the viewer application, said alerts to a user of the viewer application on a display unit.

A computerized method for detecting anomalies in monitored behavior of entities may include storing monitored events, event deviations and parameters related to each event and to each event deviation. The method may comprise receiving, by a processing unit, a plurality of event deviations and associated event deviation scores that were determined for a baseline time period, each event deviation may be comprising a predefined set of parameters. The method may comprise, constructing, by the processing unit, event deviation baseline models, each event deviation baseline model representing a behavior of a subset of selected parameters of the received event deviations. The method may comprise receiving, by the processing unit, an event deviation that occurred during an analyzed timeframe. Parameters of the event deviation may be compared to a corresponding event deviation baseline model in order to detect event anomalies.

In some embodiments, the method may include associating, by the processing unit, an event anomaly score to each detected event anomaly, and generating alerts indicating suspicious activity has been detected for an entity and a timeframe associated with the detected event anomaly.

In one embodiment, the method may comprise obtaining, by the processing unit, an analyzed timeframe and a specified entity and a context feature set comprising a plurality of context features, wherein each context feature is based on at least one parameter derived from the event anomaly. A reduced feature set may be generated from the context feature set, and an aggregated anomaly value may be calculated per specified entity per specified timeframe based on the reduced context feature set. A set of aggregated anomaly values may be generated, per entity per timeframe. A plurality of aggregated anomaly values determined during the baseline time period may be received by the processing unit, wherein each aggregated anomaly value may be calculated based on context features per a predetermined timeframe score.

The method may further comprise, constructing an anomaly baseline model, receiving new aggregated anomaly values calculated for a specified timeframe and comparing the new aggregated anomaly values to the anomaly baseline model in order to identify an aggregated anomaly value deviation. The method may further comprise, generating an alert indicating suspicious activity was detected for the specified entity during the specified timeframe.

In some embodiments, generating said reduced context feature set from the context feature set may comprise calculating a correlation measure for every pair of context features in the context feature set, defining a distance function between any two context features, and performing clustering algorithm to group correlating context features.

A context feature of the context feature set may include at least one of following parameters: a number of events detected during a specified timeframe which include the context feature, a function of the context feature score in the specified timeframe, a number of a distinct occurrences in the specified timeframe, a number of a values measured for the context feature during the specified timeframe, a number of a new values measured for the context feature during the specified timeframe, a parameter type, a correlation measure between the context feature and another context feature, and a score calculated based on a stability over time of context features.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1A:
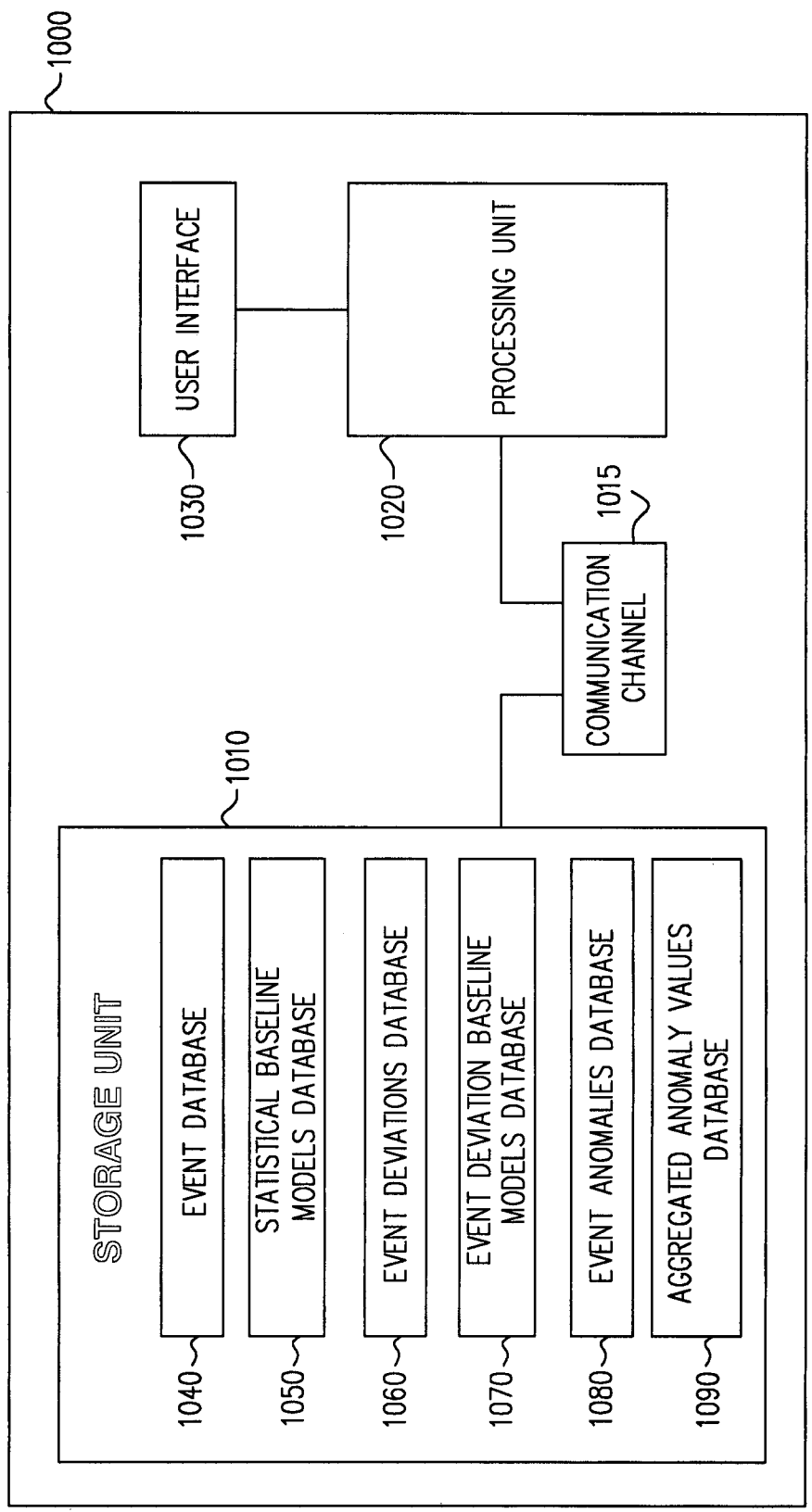

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

FIG. 1A is a schematic illustration of a system for detecting abnormal user behavior, according to embodiments of the present disclosure.

Figure 1B:
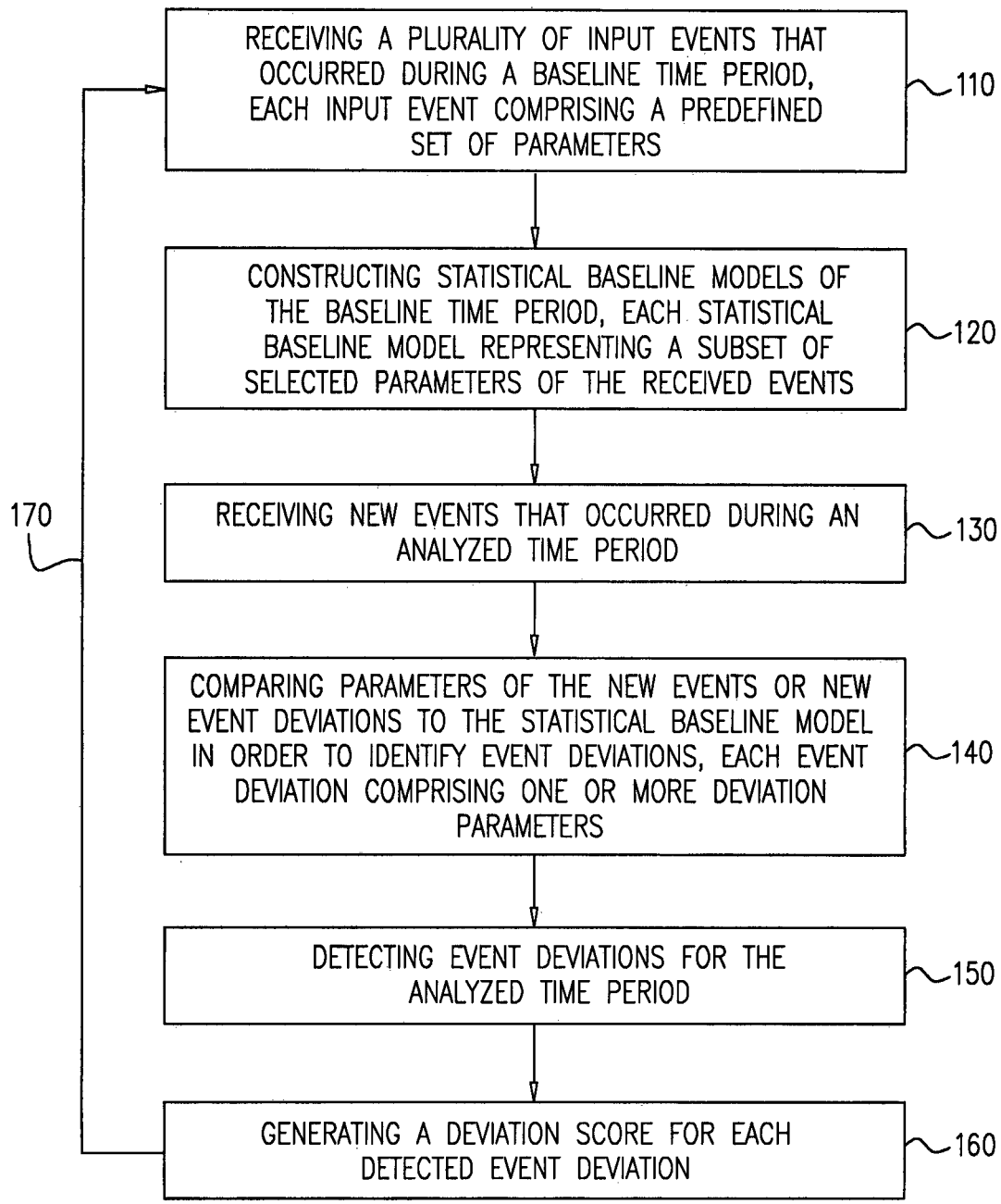
Figure 2A:
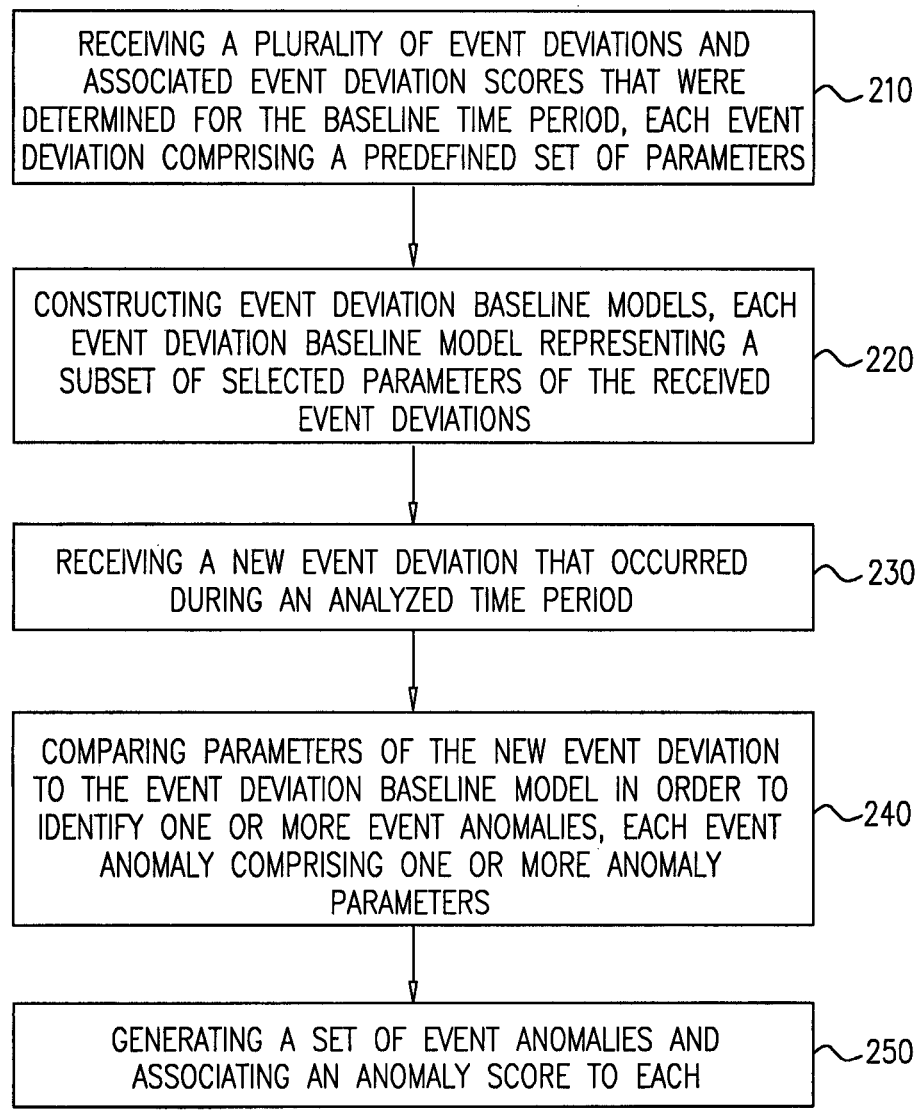
Figure 2B:
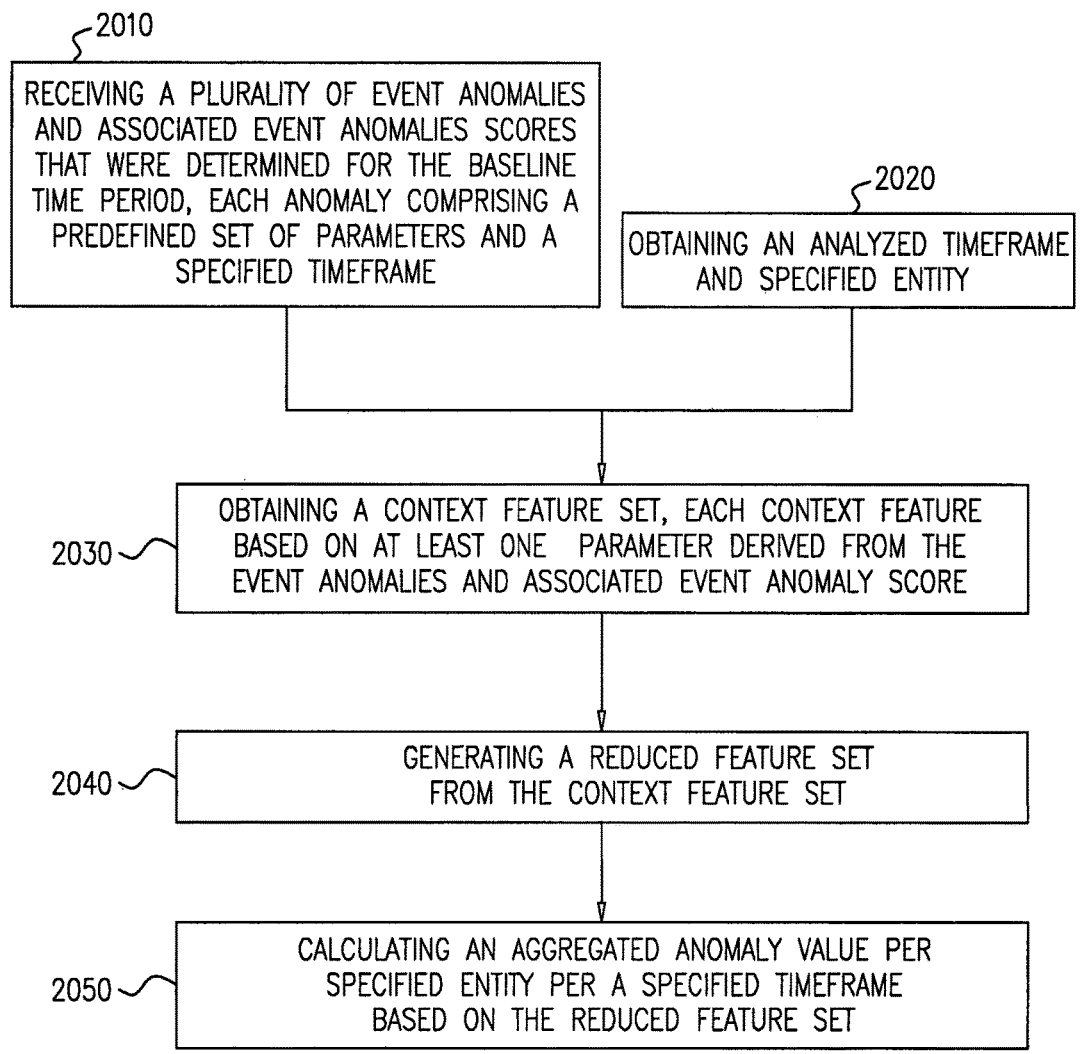
Figure 3A:
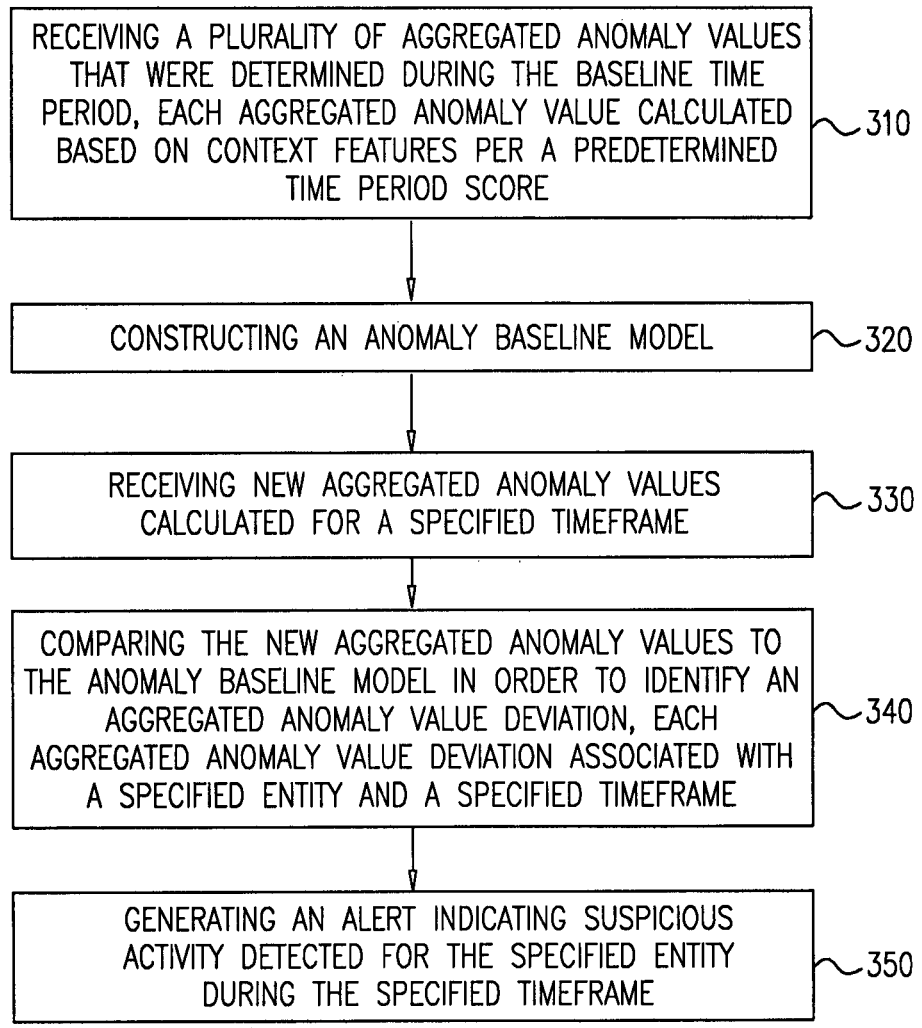
Figure 3B:
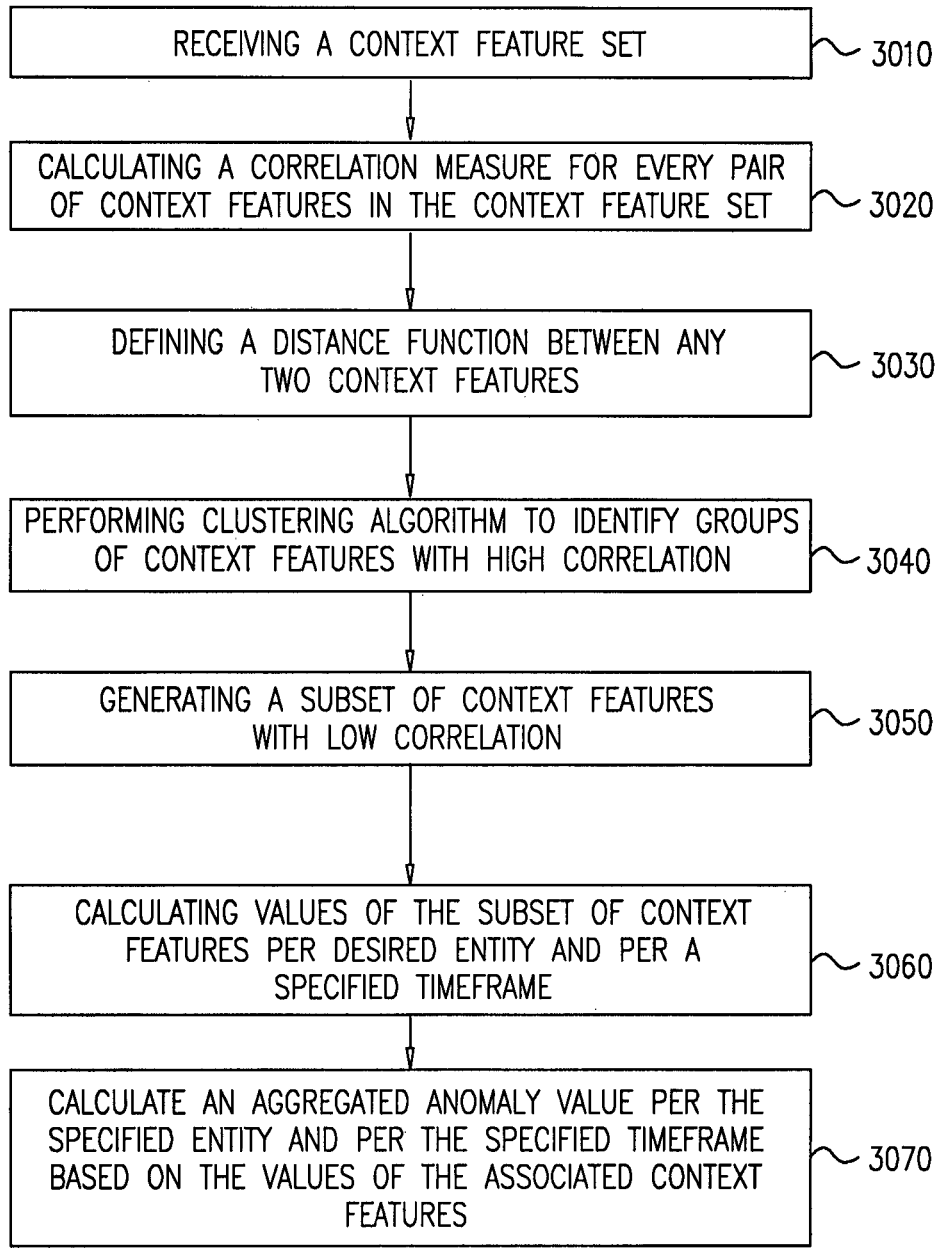

FIG. 1B is a schematic illustration of a method for construction of statistical baseline models of event parameters according to embodiments of the present subject matter;

FIG. 2A is a schematic illustration of a method for construction of event deviation baseline models, according to embodiments of the present subject matter;

FIG. 2B is an illustration of a method for aggregating event anomalies to obtain anomalies, according to embodiments of the present subject matter;

FIG. 3A is a schematic illustration of a method for constructing an anomaly baseline model and generating an anomaly alert, according to embodiments of the present subject matter; and FIG. 3B is a schematic illustration of a method for generating a reduced feature set, according to embodiments of the present subject matter.

DETAILED DESCRIPTION

In the context of the present disclosure, an 'entity' relates to a parameter, a being, a location, a device, or an existence which is associated with an event, for example, a person, a user, a computerized apparatus, a location, an employee, or a mobile device.

In the context of the present disclosure, without limiting, the term 'event' relates to something that occurs in a certain place during a particular point in time or an interval of time. An event may be an activity, an action, an occurrence, an incident, an instance, a transaction, etc. In some embodiments, a report or a summary of events, e.g. an accumulation of multiple incidents or activities, may also be considered an event. An event may include a set of accumulated or summarized events, for example, accumulation of events related to a number of employees that accessed a computerized device during a specified hour. In this example, each access of an employee may be considered a single event. Furthermore, an accumulation of events relating to a specific employee, e.g. total number of times a specific employee accessed the computerized device, may also be considered an event. In another example, an accumulation of events relating to a group of employees, e.g. a total number of times all employees accessed the computerized device during a specific timeframe, may also be considered an event.

An event may be associated with a specific timeframe or time interval or timestamp. An event may also be associated with one or more entities, e.g. a location, a person or a group of people, a transaction, a firm, or an electronic communication device. For example, an event may relate to an activity performed by a person, e.g. a person entering an office at night. Another example of an event may be a group of people initiating a conference call with a person abroad. A monitored event is an event which has been logged or recorded or stored by a computerized system.

Accordingly, 'event parameters' are a set of parameters, which are related to, associated with, and/or describe an event, such as the time of occurrence of an event, a user related to the event or initiating an event, an activity related to usage of a specific device during an event, a mobile device usage, a location of occurrence of an event, e.g. in a factory or in a firm, a time that an event began and/or ended or lasted, a number of users involved in an event, etc. Each event parameter related to an event may be associated with a specific value, which may be selected from a relevant range of values that is defined for the event parameter. The values may be, for example, discrete, continuous, or time-of-day.

Event parameters may include, for example, an event time, e.g. time of occurrence, time interval or timestamp, which may include a date and/or a beginning time of an event and/or an ending time of an event, e.g. "the event began on Tuesday, 8 AM Jan. 2, 2010 and ended on Wednesday, 5 PM Jan. 3, 2010".

In addition, event parameters may include the objects or entities which an event relates to, describes, or is associated with, e.g. a mobile device, a computer, a firm, a location, etc. Event parameters may include other features which may characterize an event and distinguish an event from other events. For example, an event parameter may include the location where an event occurred, e.g. within an office, for example, 'the conference room', and the city or state, for example, 'New York'. In yet another example, an event parameter may include an activity that was performed or occurred during the event, e.g. 'logging in to a computer', 'initiating a telephone call', changing a document, downloading a file, querying a data repository, etc.

In another example of event parameters, in a system for monitoring anomalies in traffic tickets, event parameters may include one or more of the following parameters: an event time-stamp indicating time and date of issuing the ticket, a location where the traffic ticket was issued, and an entity associated with an event (e.g. a name and/or an identification number of a person). Additional characterizing parameters which may be associated with an event may include a person's occupation, e.g. a cop, a witness, etc. Additional parameters may include a violation type, e.g. speeding, careless driving or accident, and an amount of the fine that was issued. Other parameters may be used.

In the context of the present disclosure, without limiting, the term 'model' refers to a plurality of values that are associated with parameters, e.g. event parameters or other parameters that are collected or obtained based on events occurring during a specified timeframe, relative to, or in the context of one or more specific values of another parameter/s. For example, a model may relate to values of a first parameter, e.g. 'time-of-day', in the context of a second parameter, e.g. a specific user. In another example, the model may relate to values of a first parameter in the context of a plurality of parameters, e.g. the pair of <user, location>. Yet, in another example the model may relate to values of a first parameter, e.g. 'time-of-day', in the context of, a plurality of parameters, e.g. a user, type of event and a serial number of a computerized device <user, type of event, a serial number of a computerized device>. The model may define the behavior of one or more parameters during the specified timeframe, and may enable comparison of new values of these parameters to determine anomalies or deviations of the new values from an expected behavior. The model may be represented in a graphical manner, e.g. a table, chart, a graph, a diagram, or in a mathematical manner, e.g. as an equation or a set of equations.

For brevity, the expression 'baseline time period' implies a defined, limited time period or time interval which may be used for acquiring one or more models representing various behaviors that occurred during this time period. The models acquired in the baseline time period are used for comparison of parameter values with respect to the behavior of parameters or entities during an analyzed timeframe. The baseline time period may be predetermined, e.g., a certain year may be the selected baseline time period (e.g. 2013), a specific month (e.g. January 2015), a certain day (e.g. Monday Dec. 12, 2012), etc. The baseline time period may be a fixed period that occurred before the analyzed time frame.

In the context of the present disclosure, 'baseline models' are models that represent behavior of one or more parameters, or one or more entities, which are associated with events that occurred during a predetermined baseline time period. Baseline models may be constructed for any set or subset of events, e.g. 'statistical baseline models' may be constructed for events, 'event deviation baseline models' may be constructed for event deviations, etc. Each baseline model is constructed based on one or more event parameters which are derived from a set of events that occurred during the baseline time period. A baseline model may be updated when necessary to reflect an updated behavior of the model parameters in light of new events that occurred. From each baseline model, behavior patterns of parameters or of entities may be extracted. For example, from a model that includes the exit time of employees from a certain office, it may be determined that an exit time value between 17:00 and 19:00 is 'normal office exit time' behavior for a certain person or for a group of people in the office.

In the context of the present disclosure, an 'analyzed timeframe' relates to a limited time period that may be analyzed and compared to a baseline time period, e.g. a subset of event parameters associated with events that occurred during the analyzed timeframe may be compared to one or more models corresponding to the same subset of event parameters that were constructed for the baseline time period. The analyzed timeframe is a period between two points in time. The analyzed timeframe may be a configurable and predetermined span of time, e.g., a fixed time interval, for example, a minute, an hour, a day, a week or a month. An analyzed timeframe may be sliding time intervals, e.g. sliding minutes, hours, days, weeks, months, or an analyzed timeframe obtained from another computerized system, e.g. working hours, working sessions, vacations and any other configurable analyzed timeframe In the context of the present disclosure, a 'sliding timeframe' may relate to identical portions of a timeframe in order to compare within a timeframe the different portions. For example, the system may sum the number of times a user logs into a system within an hour. The number of times a user logged in may be accumulated during the following non-overlapping sliding timeframes: between 00:00-01:00, between 01:00-02:00, etc. In some embodiments, sequential portions of the sliding timeframe may partially overlap each other, e.g. 00:00-01:00, 00:01-01:01, 00:02-01:02, etc.

In the context of the present disclosure, a 'deviation' relates to a departure from a standard, typical or normal model, behavior, routine, or norm of behavior. For example, when behavior patterns in a firm include not arriving to the office during weekends, an event which includes entrance of an employee to the office during a weekend may be determined as a deviation from the expected behavior patterns. In the context of the present disclosure, a 'deviation' may include an event deviation and/or a parameter deviation, and/or any departure of a parameter and or an event from a model constructed for that type of parameter or for that type of event.

An 'event deviation' relates to a departure of one or more event parameters from statistical baseline models that correspond to the one or more event parameters. For example, an event that occurred during an analyzed timeframe may include a person communicating via a mobile device in a specific location. The specific location may differ from a set of locations from which the person typically communicates via a mobile device according to a statistical baseline model. Such events may be identified as an event deviation, e.g. if a user has never before conducted a phone call from that specific location. Another example of an event deviation may be a person who logged into his personal computer at the office ten times during a specific day, while the statistical baseline model for the user indicates that the normal number of times the computer is logged into daily is less than five. In yet another example, a single device accessed by several users may be identified as an event deviation, since the device is typically used only by a single specific user.

In the context of the present disclosure, a 'parameter deviation' relates to a parameter associated with an entity, wherein the parameter's value deviates from an expected behavior, e.g. from a corresponding statistical baseline model. For example, one or more parameters that are associated with an event deviation may be parameter deviations. In some embodiments, a parameter deviation indicates that the associated event is an event deviation.

In the context of the present disclosure, a 'parameter anomaly' relates to a parameter associated with an entity, wherein the parameter's value deviates from or is different from an expected behavior, e.g. from a corresponding statistical baseline model. One or more parameters that are associated with an event anomaly, and which have an abnormal value compared to the statistical baseline model corresponding to these one or more parameters may be indicated as parameter anomalies. In some embodiments, a parameter anomaly is a value associated with a parameter, which is not within a predetermined range of values, or not within a range that was derived from a corresponding statistical baseline model. In some embodiments, a parameter anomaly indicates that the associated event is an event anomaly.

The terms cited above denote also inflections and conjugates thereof.

One technical problem dealt with by the disclosed subject matter relates to the amount of deviations (e.g., parameter deviations and/or event deviations) that are identified by the presently known solutions. For example, a user behavior analysis system may identify hundreds or thousands of deviations, daily, in an organization that includes tens of thousands of employees, multiple locations, millions of devices, etc. Dealing with such amount of suspicious data is unreasonable, since each suspicious event must be reviewed by a person.

Another technical problem dealt with by the disclosed subject matter relates to the variance between corporate behavior of various organizations. Different corporates or organizations apply different rules, have differing departments, methodologies, norms, etc. Detecting or searching for a certain type of threat in one organization may be inappropriate or insufficient for another organization.

Another technical problem dealt with by the disclosed subject matter relates to the variance between people's typical behaviors. There is a large variance between behavior patterns of different employees of an organization. For example, one employee may typically work from 9 AM to 5 PM, while another employee may typically work from 6 AM to 7 PM. Thus, defining an activity and/or normal behavior within an organization should include analysis of the behavior patterns of each specific employee.

Another technical problem dealt with by the disclosed subject matter relates to volatility within organizations. Corporates tend to be very volatile, meaning that even within one corporate environment there are many changes occurring in a baseline of activities, e.g. users are added and removed, access permissions are changed, machines are added, removed and reconfigured, organization structures change, companies acquire other companies, new software is installed, projects are cancelled and added on a weekly basis. It is difficult to determine, within a vast set of data, which events or behavior may be categorized as an 'insider attack' or as 'normal behavior'.

One target of the present disclosure is to detect suspicious activity of users that have valid credentials. However, this suspicious activity is not always well defined. The actual scenario depends on the circumstances (e.g. why the credentials are used illegally), what is the attacker's goal (e.g. harm the organization, sell data, or create a backdoor), the environment (e.g. which information is important, where is it stored, how is it accessed) and the risk associated with the incident. For example, in some organizations an incident involving a user who is also the General Consul of the organization may be more important than if the user is the CISO. In another organization this may be the opposite.

One technical solution relates to activating several phases of deviation detection to detect or output a significantly reduced number of suspicious events, compared to other user behavior analysis systems. A system and method according to the disclosed subject matter may enable distinguishing whether an event requires additional and/or manual review, by activating several phases of comparison of event parameters to behavioral models. The system and method according to the disclosed subject matter may determine and output results of specific entities that performed suspicious events during specific periods of time to be further examined. Thus, the solution prevents examination of unnecessary or unimportant information that may reflect usual or normal behavior.

Another target of the present disclosure is to identify behavior patterns of entities while considering the variance between people within an organization and volatility within organizations. The parameters derived from comparison of events to constructed baseline models may indicate and/or identify a suspicious activity according to various parameters associated to the event.

The present disclosure includes a method for identifying behavior patterns of entities by obtaining a plurality of events that occurred during specific periods of time, in order to construct a plurality of models based on these events. For example, a model may be constructed according to parameters of a specific user and a specific event type, and may relate to the time of day parameter, during which the event occurred <a user, type of event> <time-of-day>. In another example a model may be constructed according to parameters of a specific user and the associated time of day of the event's occurrence, and may not be limited to a specific type of event parameter, e.g., <a user> <time-of-day>. In another example, a model may be constructed according to parameters of a user and a parameter indicating a serial number of a computerized device, further relating to a location of the computerized device, e.g. <a user, a serial number of a computerized device> <a location of the computerized device>. In another example, a model may be constructed according to parameters of a user and a type of event, relating to a total number of events that occurred during a specified hour <a user, an event type> <total number of events in an hour>. In another example, a model may be constructed according to parameters of a user and an event type, related to a total number of events during a sliding hour <a user, a type of event> <total number of events during a sliding hour>.

According to the present disclosure, a single event may generate a plurality of deviations. With respect to the previous examples, a single event may trigger or cause generation of the following parameter deviations: a user logged into a computerized device during a time-of-day that deviates from his/her normal log-in activity as defined in a corresponding model, or a user logged in to a specified computerized device at a location that deviates from the normal location as defined in a corresponding model that was constructed for the specific user for the specific device.

A deviation, e.g. an event deviation or a parameter deviation, may relate to a specified timeframe. For example, a user was active from a specified computerized device at a location that deviates from the corresponding model of locations constructed for the user and the device, during the timeframe between 11:00-12:00 on a certain date. In another example, a user was active in a certain type of activity that deviates from the activity type model that was constructed for that user, e.g. during the timeframe between 11:34-12:34 on a certain date.

Constructing a plurality of models per user improves the ability to pinpoint deviations that are not in accordance with a user's behavior, as determined or as learned by the system (e.g., by comparing an event to a corresponding model). Thus, by comparing values of parameters derived from events to corresponding constructed models, a plurality of deviations may be obtained from each event. In a noisy environment, in which many events occur and many deviations are obtained, it is critical to extract a reduced number of events that may be relevant to insider-threat security incidents, and to separate them from events that may be considered as typical or normal behavior of a user. The present disclosure includes identifying deviations in a noisy environment by determining a plurality of models that define each user's behaviors, and identifying deviations from the models. By performing the deviation detection recursively, e.g. deviations detected in one iteration are provided as input events to a next iteration, the method allows reducing the number of detected deviations, and focusing on detection of deviations that may be related to insider-threat security incidents.

A potential technical effect of the disclosed subject matter may enable identifying insider-threat security incidents via recursive anomaly detection of user behavior, which may be used in an organization such as a firm, a state, or any group that requires cyber safety.

A general non-limiting presentation of practicing the present disclosure is given below, outlining exemplary practice of embodiments of the present disclosure and providing a constructive basis for variant and/or alternative embodiments, some of which are subsequently described.

Reference is now made to FIG. 1A, which is a schematic illustration of a system for detecting abnormal user behavior, according to embodiments of the present disclosure.

An anomaly detection system 1000 may be or may include a computerized apparatus, e.g. a computer or a server, and may include or may be operationally connected to a storage unit 1010, a processing unit 1020 and a user interface 1030, which may be implemented, e.g. on a display unit, via a communication channel 1015, e.g. a wireless or wired network (e.g. cellular network, Wi Fi, Bluetooth, Local Area Network or Wide Area Network, VPN, SSH).

The anomaly detection system 1000 may receive, e.g. via the communication channel 1015 and/or from the storage unit 1010, event input data including events and related event parameters from one or more sources, e.g. predetermined data structures such as log repositories, log files or database records that provide events details. The input data may be accumulated by computerized systems that may be located within an organization or connected to a computer network of an organization. The received event data may be stored in an event database 1040, which may be a database or storage unit that stores the data in a predetermined format.

The storage unit 1010 is configured to store data which may be used for modeling behavioral patterns. The storage unit 1010 may include, or may be operationally connected to, one or more storage units that store event parameters, event deviations, statistical event baseline models, event deviation baseline models, event anomalies, aggregated anomaly values, etc. Storage unit 1010 may be operationally connected to, for example, an event database 1040, which stores information and parameters relating to logged events. Such information may include event parameters and any other data which may be used to characterize an event. An event stored within the storage unit 1010 may be associated with an entity, e.g. a person, a time of occurrence, a device, a location, etc.

Storage unit 1010 may further include, or may be operationally connected to, a statistical baseline models database 1050. The statistical baseline models database 1050 stores information related to statistical baseline models derived from e.g. the event database 1040 or obtained from an external input database. A statistical baseline model is constructed based on event parameters relating to events that occurred during a predefined baseline time period. The statistical baseline model may be represented in a graphic manner and/or in a mathematical manner, as e.g. a graph or a table, and may enable a comparison of event parameters to a corresponding statistical baseline model.

Storage unit 1010 may further include, or may be operationally connected to, an event deviation database 1060, which includes data or information related to event deviations, e.g. events which have been determined as deviating from expected or normal behavior patterns. Storage unit 1010 may further include, or may be operationally connected to, an event deviation baseline models database 1070 for storage of event deviation baseline models. Storage unit 1010 may further include, or may be operationally connected to, an event anomalies database 1080 for storage of event anomalies and related values.

Processing unit 1020 may be a hardware processor, e.g. an electronic circuitry that carries out the instructions of a program or application or software code, performing and/or executing arithmetic, logical, control and input/output (I/O) operations specified by the program and/or software and/or application instructions. In the present disclosure processing unit 1020 is adapted to perform operations as detailed herein.

The processing unit 1020 may be connected via the communication channel 1015 to the storage unit 1010, from which data is received and sent to, and to the user interface 1030 to display output relating to anomalous or suspicious behavior to a user.

The processing unit 1020 may be configured to construct statistical baseline models of parameters that are associated with a set of baseline events that occurred during a predefined baseline time period. Each statistical baseline model stored in statistical baseline models database 1050 represents a behavior of a subset of selected parameters of the set of baseline events. Processing unit 1020 may compare event parameters associated with new events that occurred during an analyzed timeframe, to a corresponding statistical baseline model that was calculated for the event parameters, in order to identify event deviations, each event deviation includes one or more parameters.

The processing unit 1020 may be configured to activate a plurality of deviation detection phases, e.g. a first deviation detection phase, a second deviation detection phase, an event anomaly aggregation phase, a context feature reduction phase and/or a final deviation detection phase.

During the first deviation detection phase, the processing unit 1020 may analyze a plurality of events that occurred during an analyzed timeframe, e.g. received from event database 1040. Each event includes a predefined set of parameters. For each event in the analyzed timeframe, the processing unit 1020 detects deviations from relevant statistical baseline models, e.g. event deviations, and/or parameter deviations. A set of event deviations is generated for an analyzed timeframe. An event deviation score may be associated with each detected event deviation. The determined event deviations may be then stored in the event deviation database 1060. Event deviations derived from the comparison include events that include suspicious or different or deviating parameters compared to behavior patterns represented in the statistical baseline models.

For example, when an entity, e.g. a mobile device, was activated in a specified location, e.g. Chicago, and according to a statistical baseline model that represents the locations in which the mobile device was activated, 'Chicago' may be detected as a parameter deviation, compared to the statistical baseline model that includes locations of mobile device activation during the baseline time period. Accordingly, the event may cause or trigger generation of a deviation, e.g. an event deviation, and may be stored in the event deviation database 1060 for further examination.

An event deviation may include, or may be associated with, an event deviation score, which corresponds to or indicates a measure, a distance, a level or an amount of difference between parameters associated with the event deviation to one or more corresponding statistical baseline models.

The event deviation score may be based on, or associated with, or correlated to additional attributes, such as a deviation certainty, which indicates the level of certainty that the event is indeed a deviation. An event deviation score may be represented by e.g. a value, a list of values, and may or may not be within a certain predetermined range values. An event deviation score may be a value representing a level or an extent to which the event deviation violated and/or deviated from a baseline time period model.

An analyzed event may be associated with a plurality of parameter deviations when compared to one or more corresponding statistical baseline models. Thus, each parameter deviation may be scored separately, e.g., a parameter deviation score may be calculated for each parameter deviation (for example, but not necessarily, in a predetermined range, e.g. of [0-100]), and an event deviation score may be calculated based on the parameter deviation scores associated with the event, e.g. by determining the maximum parameter deviation score as the event deviation score, or any other function which is based on at least a portion of the parameter deviation scores of the event. In some embodiments, the event deviation score may be impacted from all the deviation scores with which this event is associated.

The comparison of event parameters obtained during the baseline time period to event parameters obtained during the analyzed timeframe may be continuously activated by processing unit 1020, e.g. by using a recursive method, which may use event parameters, deviations, and event scores obtained during a previous iteration as input data for determining abnormal activity in comparison to a corresponding statistical baseline model.

In a system for monitoring traffic tickets events target, for example, an analyzed timeframe may include events that occurred between Jan. 2, 2015 to Jan. 31, 2015. The following event deviations may be detected:

(1) An event that includes a traffic ticket issued at a new location for the first time may be determined as a parameter deviation (relating to the location parameter associated with the event), and the event may be determined as an event deviation.

(2) A fine was issued, that exceeded twice the hourly average between 10 am-11 am, may be determined as a parameter deviation (relating to the amount parameter associated with the event), and the event may be determined an event deviation.

During the second deviation detection phase, event deviations from the event deviation database 1060 may be obtained, e.g. accessed via the communication channel 1015 by the processing unit 1020, in order to construct event deviation baseline models which may be stored in the event deviation baseline models database 1070. The second deviation detection phase may be activated in order to model behavior patterns of event parameters which were determined as event deviations during a predetermined baseline time period.

The second deviation detection phase may include generating a second set of deviations, also referred to herein as 'recursive deviations' or event anomalies, which include event deviations that have been determined as deviating from corresponding deviation baseline models. In some embodiments, where more than two iterations of the recursive deviation detection phase are performed, each iteration (except the first one) may result in a set of recursive deviations or event anomalies.

Parameters of event deviations that occurred during an analyzed timeframe may be compared with corresponding event deviation baseline models in order to identify one or more parameter anomalies and based on the parameter anomalies, a set of event anomalies may be generated. The parameter anomalies and the event anomalies may be stored in the event anomalies database 1080 within the storage unit 1010. Each event anomaly includes one or more parameters, at least one of which is a parameter anomaly. Each event anomaly may be associated with an event anomaly score.

The event anomaly score corresponds to or indicates a measure, a distance, a level or an amount of difference between parameters associated with the event anomaly and one or more corresponding event deviation baseline models. The event anomaly score may be based on, or associated with, or correlated to, additional attributes such as an anomaly certainty, which indicates the level of certainty that the event is indeed an anomaly. An event anomaly score may be represented by e.g. a single value or a plurality of values.

For example, when an event deviation occurs, e.g. an access to a computer during a weekend, deviates from an expected set of values, or deviates from a corresponding event deviation baseline model (stored in, for example, event deviation baseline models database 1070), the event deviation may be indicated as an event anomaly. In some embodiments, one or more parameters associated with the event deviation may be indicated as parameter anomalies.

Hence, when an event deviation meets an expected behavior of the related event deviations, e.g. a corresponding event deviation baseline model, the event deviation may be not determined as an event anomaly, but rather as an 'expected' event. For example, an employee may log into his computer each night during a specified week, and an event deviation baseline model may indicate that many other employees logged into their computers during nights of the same week. Therefore, if similar event parameters were identified for a plurality of other entities (e.g. additional employees), the event may be determined as a 'normal' or an 'expected' event, and the event deviation score may indicate that the event is not an anomaly, for example, that the distance or difference between the event and the expected behavior is small.

Event deviation baseline models are constructed based on event deviations which were identified in the first deviation detection phase. Each event deviation baseline model includes one or more event parameters, which are predetermined per each event deviation baseline model.

An event anomaly represents an event deviation which was identified after the second deviation detection phase, as deviating from the plurality of event deviations that were determined during the first deviation detection phase. The second deviation detection phase may be applied or activated by processing unit 1020 to generate event anomalies which include event deviations that were determined to be different from or deviating from a corresponding event deviation baseline model. An event anomaly includes an aggregated anomaly value, and is associated with a specific entity and a specified timeframe.

Event anomalies may be stored in the event anomalies database 1080. The event anomalies database 1080 may be, e.g. a folder in a file system, a database, a storage unit, or any other data structure as known in the art, for storing the plurality of event anomalies.

For example, a first statistical baseline model may indicate that each employee of a firm uses his/her mobile device for phone calls during 20-50 hours per month. After a first deviation detection phase, three employees may have been identified as having an increased mobile call usage during a specific month, e.g. during March 2015, e.g. User A used his mobile for phone calls for 90 minutes, User B used his mobile for phone calls for 100 minutes, and User C used his mobile for phone calls for 2,110 minutes. These events may be determined as event deviations, based on comparison of the monthly aggregated call duration to a corresponding statistical baseline model. In a second event deviation detection phase, an event deviation baseline model may be constructed for the event deviations that were determined for the monthly mobile call duration of employees. Based on the constructed event deviation baseline model, the third event may be determined an event anomaly after the second deviation detection phase, while the other events may be determined as normal or expected deviations. An event anomaly and an associated event anomaly score may be calculated and stored in the event anomalies database 1080.

During an event anomaly aggregation phase, the processing unit 1020 receives a plurality of event anomalies and their associated event anomaly scores, that were determined for events which occurred during the baseline time period, each event anomaly includes a predefined set of parameters and a specified timeframe.

The processing unit 1020 obtains a specified timeframe and specified entity, and receives a context feature set, wherein each context feature is based on at least one parameter derived from an event anomaly and its associated event anomaly scores. The processing unit 1020 then calculates a value associated with each context feature, based on the parameter values of the event anomalies. The context features are used to model the behavior of the event anomalies that were previously determined.

Context features may include one or more event parameters $P_1, \ldots, P_n$, or combinations thereof, and may be stored along with a value $V_i$ which is a value associated with an event anomaly for parameter $P_i$. A context feature set includes context features that are based on at least one parameter derived from the second deviation detection phase. Additionally, a context feature score $S_i$ may be calculated, indicating that the value $V_i$ for parameter $P_i$. For each parameter $P_i$, context features may include predetermined equations or calculations which are computed by processing unit 1020 based on values of the parameter. Context features may include linear or non-linear combinations or functions, based on event anomaly parameters and associated anomaly scores during a specified timeframe. For example, context features may be selected from a maximum value of $P_i$ in the specified timeframe, average and/or mean value of $P_i$ in the specified timeframe, a number of distinct occurrences of any specific value $V_i$ in the specified timeframe, a number of new value $V_i$ in the specified timeframe, a type of $P_i$ indicating the parameter of event anomaly, etc.

Each context feature represents statistical information related to an entity and a specified timeframe. Multiple features for the same entity and a specified timeframe may be obtained, and may include, for example, a number of events that occurred during a specified timeframe which are related to or associated with the entity; a number of event deviations of a specific deviation type (e.g. a specific parameter deviation) that occurred during a specified timeframe which was related to or associated with the entity; an event deviation score calculated for events related to or associated with the entity during a specified timeframe; a number of new values obtained for parameters in events including a specified entity in a specified timeframe, wherein a new value for a parameter may be a value which was not previously recorded; relationships between any of the above features for an entity over a specified timeframe, a combination of one or more context features, etc.

The context features are predetermined or may be obtained from an external source or repository. Since the amount of context features obtained based on event logs may be very large, e.g. in a large organization, it is advantageous to automatically extract the important or most relevant features. Identifying a reduced feature set may be required in order to enable behavior modeling and anomaly behavior detection.

The processing unit 1020 generates a reduced feature set from the full context feature set by activating the context feature reduction phase. For example, an entity may be associated with a context feature set of n features, e.g. $A_1$-$A_n$. Examples for context features may include, for example, an average event deviation score, average parameter deviation score, a maximum event deviation score, maximum parameter deviation score, a correlation between average and maximum deviation scores or anomaly scores associated with the entity, etc.

During the context feature reduction phase, after obtaining a context feature set, a correlation measure or score may be calculated by processing unit 1020 for pairs of context features in the context feature set, e.g. for each possible pair of features.

Clustering algorithms denote to a task of grouping a set of objects in such a way that objects in the same group are more similar to each other than to those in other groups. Therefore, in the context of the present disclosure, a clustering algorithm may be applied to generate a subset of context features with low correlation to each other.

The processing unit 1020 may calculate a distance function between any two context features and perform a clustering algorithm, for example, Pearson correlation algorithm, Lloyd's algorithm or Highly Connected Subgraphs (HCS) clustering algorithm, to identify groups of context features with high correlation to each other. Other clustering algorithms may be used.

Different types of context features may be defined. A first context feature type may be calculated based on parameters of event deviations. A second context feature type may be based on correlation between context features of the first type. A third context feature type may be based on a stability over time of context features.

The first context feature type may include context features selected from, for example: a number of occurrences of a certain type of event, a number of failures, a total number of parameter deviations, a number of clustered parameter deviations, a number of parameter that include maximum amount of occurrences in events, number of clustered parameters that include maximum amount of occurrences in events, number of parameters that appeared the first time for an entity, a number of clustered parameters that appeared the first time for an entity, number of changes in the value of a parameter (e.g. a specified parameter received a different value from its previous detected or recorded value), number of changes to values in clustered parameters, number of event parameters which deviate from an event deviation baseline model during an analyzed timeframe per a specified entity, number of distinct high score parameter anomalies (or clustered parameter anomalies).

One example for a first context feature type may be related to authentication of users' login events to (and from) a certain machine. Context features of the first type may include the following context features: a source machine identifier, a destination machine identifier, a login type and a login result. The system for anomaly detection may search for suspicious activities that are related to source machine Src1, during a certain calendric hourly timeframe. The following context features may be used: a maximum score of a parameter deviation for Src1 in a calendric hour, a total number of login errors for Src1 in a calendric hour, a total number of event deviations associated with Src1 wherein the parameter deviation is related to the source machine identifier feature.

The second context feature type relates to pairs of the first context feature type, wherein each pair includes context features that are determined to have a sufficiently high correlation to each other (e.g., above a certain correlation threshold). Context features of the second context feature type may be generated according to one or more predetermined formula, e.g. if (feature A of the first context feature type=$a_0+a_1$*feature B of the second context feature type), then a new feature may be generated as follows: feature A/($a_0+a_1$*feature B).

The third context feature type is based on the first context feature type. For each context feature, a control chart is generated and the first context feature type value is divided into a number of regions, e.g. three regions, according to standard deviations. For example, Region A may be defined as smaller than or equal to an absolute value of one standard deviation (A≤|1SD|), Region B may be defined as larger than an absolute value of one standard deviation or smaller than or equal to an absolute value of two standard deviations |1SD|<B≤|2SD|, and Region C may be defined as larger than an absolute value of two standard deviations or smaller than or equal to an absolute value of three standard deviations |2SD|<C≤|3SD|. Known rules may be used, e.g. Nelson rules or Western Electric rules, to detect a first context feature type with a deviating pattern or abnormal behavior.

The processing unit 1020 may generate a subset of context features with low correlation by determining a representative feature of each context feature group which was clustered to create a reduced set of context features. The processing unit 1020 may calculate values of the subset of context features per desired entity and per specified timeframe.

The processing unit 1020 calculates an aggregated anomaly value per specified entity per specified timeframe, based on context features of the reduced context feature set, and generates a set of aggregated anomaly values per entity per timeframe which are stored in the aggregated anomaly values database 1090. During a third or final deviation detection phase, the processing unit 1020 may receive a plurality of aggregated anomaly values from the aggregated anomaly values database 1090 which were determined for events that occurred during the baseline time period. The processing unit 1020 generates an anomaly baseline model which is constructed based on event anomalies that were identified during the second deviation detection phase. The anomalies baseline model represents the behavior of the event anomalies that were determined for the baseline time period. The anomaly baseline model may be represented in a graphical manner, e.g. a table, chart, a graph, a diagram, or in a mathematical manner e.g. as an equation or formulation.

When a new aggregated anomaly value is calculated for a specified timeframe, the processing unit 1020 compares the new aggregated anomaly value to the anomaly baseline model in order to identify an aggregated anomaly value deviation which is associated with a specified entity and a specified timeframe. The aggregated anomaly value deviation is an aggregated anomaly value which deviates or is different from an expected value or range of values derived from the corresponding event anomaly baseline model. If the anomaly deviation value indicates that a suspected anomaly occurred, the processing unit 1020 generates an anomaly alert, indicating suspicious activity has been detected for the specified entity during the specified timeframe.

Processing unit 1020 may be configured to display the anomaly alert, on a provided viewer application or graphic user interface, when the final deviation detection phase is completed. The anomaly alert may be displayed to a user via the user interface 1030, for example audibly or visually on a display unit. The alert may include, e.g., the aggregated anomaly values calculated for a specified timeframe and a specific entity during the final deviation detection phase. The aggregated anomaly values calculated for a specified timeframe and a specific entity may be represented as a score or a number, for example an aggregated anomaly value of 70.

Reference is now made to FIG. 1B, which is a schematic illustration of a recursive method or process of deviation detection, which includes construction of statistical baseline models of event parameters according to embodiments of the present subject matter. One or more of operations 110-160 may be performed when activating one or more deviation detection phases or iterations.

In a first iteration (or a first deviation detection phase) of the deviation detection process, operation 110 includes receiving a plurality of events from the event database 1040 that occurred during a baseline time period, in order to perform a first deviation detection phase. Each event includes a predefined set of parameters. The events that are received from external event or log repositories may be stored in event database 1040, and may be accessed by the processing unit 1020 via communication channel 1015 in order to construct statistical baseline models.

Operation 120 includes constructing statistical baseline models of the baseline time period, each statistical baseline model representing a behavior of a subset of selected parameters of the received events.

The statistical baseline models may be constructed to demonstrate the statistical behaviors or behavior patterns of parameters with respect to the parameters themselves and to other parameters and/or to combinations of parameters. The statistical baseline models may be stored in the statistical baseline models database 1050.

The baseline time period represents events which occurred within a limited, predetermined timeframe, for example, a year that begins at Jan. 1, 2015 and ends at Jan. 1, 2016.

For example, in a system for monitoring issued traffic tickets, a statistical baseline model may represent traffic tickets issued during a baseline time period between Jan. 1, 2014 and Jan. 1, 2015. The following statistical baseline models may be calculated:
(1) Locations in which tickets were issued during the baseline time period for every policeman. Parameters of this model include a location, a policeman ID.
(2) The total amount of fines issued during an hour for every policeman and for every calendar hour in the baseline time period. Parameters of this model include a total fine amount, a policeman ID, and an hour.

(3) The max fine amount issued in an hour for every policeman and for every calendar day in the baseline time period. Parameters of this model include a maximum fine amount, a policeman ID, and an hour.

A statistical baseline model represents a subset of selected parameters of an event. Various statistical baseline models may be generated according to the same subset of selected parameters of an event relating to different parameters. For example, if the subset of selected parameters relates to a user's activity, e.g. accessing a computerized device, in a specified location, e.g. New York, one statistical baseline model may relate to the user's activity and another statistical baseline model may relate to activity's location.

Operation 130 may include receiving new events that occurred during an analyzed timeframe. The analyzed timeframe typically includes new events that occurred after the baseline time period, that may be continuously obtained from a log repository by processing unit 1020. New events may be received, for example, in a streaming process from an event logging database, or in a batch, e.g. log file that is generated by an event logging system for a specific timeframe, e.g. a day, a week, an hour, etc.

Operation 140 may include comparing event parameters of the events which occurred during the analyzed timeframe to a corresponding statistical baseline model to identify event deviations, each event deviation including one or more parameters or a combination of parameters. An event deviation may be defined as an event, in which at least one of the event parameters was determined to be deviating from an expected behavior or pattern, e.g. as derived from a statistical baseline model corresponding to that parameter.

The event deviations may be determined for an event which was associated with at least one parameter deviation. For example, a parameter deviation may be related to a location of a person, a score related to a specified location, a number of events that occurred between e.g. 1 PM-2 PM on Feb. 22, 2014, etc.

Yet, in another embodiment, the analyzed timeframe may include events that occurred during the baseline time period, using a recursive method. For example, in a system for monitoring traffic tickets issued during a baseline time period between Jan. 1, 2014 to Jan. 1, 2015, parameters of events that occurred during that period may be analyzed and/or compared to a corresponding statistical baseline model. The comparison may generate event deviations such as, a person was engaged in an unusual incident, e.g. issued a traffic ticket at an unusual location, e.g. Washington, at a specified time, e.g. Jan. 3, 2014 and a corresponding event deviation score may be calculated. Or for example, an exceptional number of total events, e.g. total number of tickets that were issued at a specified location, e.g. Memphis, during a specified timeframe, e.g. May 13, 2014.

Operation 150 includes the first phase of deviation detection, in which a set of event deviations are generated for the analyzed timeframe. The event parameters that are received by the processing unit 1020 via the communication channel 1015 during the analyzed timeframe, may be compared to a corresponding statistical baseline model and an event deviation score may be calculated. The system outputs a set of events that are indicated as event deviations. A set of event deviations may include, for example, a computerized device that was accessed by various users at a specified hour, e.g. between 9 AM and 9:30 AM, a user who entered an office during a weekend, a mobile device used continuously for 2 hours each day of a specified month, e.g. January.

Operation 160 includes calculating one or more event deviation scores for each indicated event deviation. An event deviation score may be a value representing the level or extent to which the event deviation violated and/or deviates from a corresponding baseline time period model. For example, in one embodiment, an event deviation score may be between 0-100, e.g. 44. The event deviation score may be based on, or associated with, or correlated to e.g. a deviation type, a model which the deviation violated or has deviated from, and a distance between the expected value and the value that was calculated for at least one event parameter associated with the event deviation.

Processing unit 1020 may be configured to output an event deviation alert upon completion of the first phase of deviation detection. The event deviation alert may be displayed to the user via the user interface 1030, e.g. audibly sounded or visually displayed on a display unit, and may include data relating to event deviations that were determined during the first phase of deviation detection.

After the first iteration is completed, a second iteration (also referred to as a second deviation detection phase) of the recursive method for detecting deviations may be performed. Arrow 170 indicates that, upon completion of the first phase of deviation detection, the operations of the method may be repeated one or more times with a new set of input events, which are the results of the previous iteration that was performed. Each of operations 110-160 may be recursively performed, by using the results obtained during a previous phase of deviation detection. Each iteration of the recursive method for deviation detection includes repeating operations 110-160. Each iteration results in advanced deviation detection phases, which are based on the previous deviation detection phase results.

For example, a second iteration may include a second deviation detection phase, which may be based on the first iteration results, e.g. the first deviation detection phase results. In some embodiments, a plurality of iterations may be performed, e.g. a third iteration may include third deviation detection phase based on the deviations determined during the second iteration, etc.

The recursive deviation detection process may be stopped upon satisfaction of one or more stopping conditions. The one or more conditions for stopping iterations of the recursive deviation detection may be predetermined in the anomaly detection system 1000, or may be configurable according to a user's configuration.

For example, a condition for stopping iterations of the recursive deviation detection may be determined according to the quantity of event deviations detected after a certain iteration. For example, a predetermined condition may be checked (e.g. one hundred event deviations were detected). If after two iterations the amount of event deviations reached one hundred, the predetermined condition is satisfied and the recursive detection process may be stopped.

Thus, if a plurality of event deviations were detected during a first iteration and the quantity, e.g. 1000 event deviations were detected per a specified day, may be not manageable, an additional iteration may be performed. The second iteration may be performed in order to reduce the number of suspected events (e.g., the event deviations) to a manageable amount, e.g. 100 event deviations were determined for a specified day, or in order to decrease the amount of detected event deviations by a predetermined percentage, e.g. 50%, which may be sufficient to allow a person to review the detected suspicious activity related to an entity to determine whether an insider threat is suspected. In this example, the condition for stopping iterations of the recursive deviation detection may include checking if less than a predetermined amount of suspected events was identified after performing an iteration. In another example, the number of iterations may be predetermined in the system, for example two iterations may be performed before stopping the recursive process.

During the recursive deviation detection process, in each iteration (except for the first iteration), a plurality of input events and associated deviation scores may be received by the processing unit 1020. Processing unit 1020 constructs event deviation baseline models based on deviations which were determined during the previous phase of deviation detection according to embodiments of the present subject matter.

Each of the iterations includes performing operations 110-160, and results in advanced deviation detection phases. Hence, advanced deviation detection phases may be performed using deviations which were obtained during the previous deviation detection phase.

For example, in the first iteration, operation 110 includes receiving a plurality of input events. In a next iteration, e.g. a second iteration, the input events are deviations that were determined during the first iteration, thus in a second iteration, operation 110 includes receiving a plurality of deviations and their associated deviation score.

A plurality of deviations and associated deviation scores which are obtained during a second or later iteration (herein, 'advanced deviation detection phase'), e.g. a second deviation detection phase, may be determined by the processing unit 1020, and may be stored, e.g., in the event deviation database 1060.

During an advanced deviation detection phase, operation 120 includes constructing one or more baseline models. For example, during the second iteration, deviation baseline models are constructed by processing unit 1020, and may be stored in the deviation baseline models database 1070.

Event deviations patterns, or behaviors, may be represented by the event deviation baseline models. The event deviation baseline models may define the behavior of one or more event parameters associated with a deviation, and may enable a comparison of a new deviation to a corresponding deviation baseline model. The event deviation baseline model may be represented in a graphical manner, e.g. a table, chart, a graph, a diagram, or in a mathematical manner e.g. as an equation or formulation.

During an advanced deviation detection phase, operation 130 includes obtaining new event deviations that occurred during an analyzed timeframe, e.g. by processing unit 1020.

During an advanced deviation detection phase, operation 140 includes comparing event parameters of the obtained event deviation to a corresponding event deviation baseline model that was constructed during a previous deviation detection phase, in order to identify event deviations. Event deviations may be related to herein as 'event anomalies', when determined during an advanced deviation detection phase.

For example, during a second deviation detection phase, operation 140 includes comparing event parameters of the obtained event deviations to a corresponding event deviation baseline model constructed during the first deviation detection phase. Each event deviation (or event anomaly) includes one or more parameter deviations/parameter anomalies. The comparison may determine event deviations/event anomalies and may associate an event deviation score or an event anomaly score to each determined event deviation/anomaly.

An event deviation and/or event anomaly may relate to, for example, a person who is associated with one or more event deviations that did not conform to expected behavior according to the corresponding event deviation baseline models.

An event deviation score and/or event anomaly score may be a value representing the level or extent to which the event deviation and/or event anomaly, respectively, violated and/or deviated from a corresponding event deviation baseline model. The event deviation score and/or event anomaly score may be based on, or associated with, or correlated to a baseline deviation model which the event deviation and/or event anomaly violated or deviated from.

The deviation type or anomaly type may be based on the parameters of a corresponding event deviation baseline model or a corresponding event anomaly baseline model. The corresponding event deviation baseline model which the event deviation or event anomaly violated or has deviated from, and a distance between the expected value and the value that was calculated for at least one event parameter associated with the event deviation or event anomaly.

Based on the comparison of operation 140, a set of event deviations and/or event anomalies is generated in operation 150, and the deviation/anomaly events along with their associated event deviation/anomaly scores are stored in the event deviation database 1060 and/or anomalies database 1080.

After performing at least a second iteration of the deviation detection process, processing unit 1020 may be configured to output an event anomaly alert. The event anomaly alert may be displayed to the user via the user interface 1030, e.g. audibly sounded, and/or visually displayed on a display unit. The event anomaly alert may include data relating to anomaly events detected during the advanced deviation detection phases.

It is noted that additional iterations may be performed, to further model the behavior of deviations detected in previous iterations of the deviation detection process. In some cases, performing additional iterations may further reduce the amount of suspected events or event anomaly alerts that the anomaly detection system 1000 provides.

Reference is made to FIG. 2A, which is a schematic illustration of a method for construction of event deviation baseline models, according to embodiments of the present subject matter. One or more of operations 210-250 may be activated in order to perform a second deviation detection phase. It is noted that operations 210-250 may also be referred to as a second iteration of the deviation detection process described in operations of FIG. 1B.

Operation 210 includes receiving a plurality of event deviations and associated event deviation scores determined by the processing unit 1020, and stored, e.g., in event deviation database 1060. The event deviations and associated event deviation scores were determined for the baseline time period during the first deviation detection phase, each event deviation including a predefined set of parameters.

Operation 220 includes constructing one or more event deviation baseline models by processing unit 1020, which may be stored in the event deviation baseline models database 1070. Processing unit 1020 constructs event deviation baseline models based on event deviations which were determined during the first phase of deviation detection according to embodiments of the present subject matter.

Event deviations patterns, or behaviors, may be represented by the event deviation baseline models. The event deviation baseline models may define the behavior of one or more event parameters associated with an event deviation, and may enable a comparison of a new event deviation to a corresponding event deviation baseline model. The event deviation baseline model may be represented in a graphical manner, e.g. a table, chart, a graph, a diagram, or in a mathematical manner e.g. as an equation or formulation.

For example, when an event deviation is related to accessing a computerized device from a location that deviates from the normal location in which a specified user accesses from, an event deviation baseline model may represent the number of times during which a computerized device was accessed from that location during each hour for the specified user. The event deviation baseline model may include the values of 5 accesses (during a $1^{st}$ hour), 10 accesses (during a $2^{nd}$ hour), 7 accesses (during a $3^{rd}$ hour), etc.

Operation 230 includes obtaining a new event deviation that occurred during an analyzed timeframe, e.g. by processing unit 1020.

Operation 240 includes comparing event parameters of the obtained event deviation to a corresponding event deviation baseline model during the second deviation detection phase, in order to identify event anomalies. Each event anomaly includes one or more parameter anomalies. The comparison may determine event anomalies and may associate an event anomaly score to each determined event anomaly.

An event anomaly may include for example, a person associated with one or more event deviations that did not conform to expected behavior according to the corresponding event deviation baseline models.

An event anomaly score may be a value representing the level or extent to which the event anomaly violated and/or deviated from a corresponding event deviation baseline model. The event anomaly score may be based on, or associated with, or correlated to e.g. an anomaly type, a baseline deviation model which the event anomaly violated or deviated from.

Based on the comparison of operation 240, a set of event anomalies is generated in operation 250, and the anomaly events along with their associated event anomaly scores are stored in the event anomalies database 1080.

Processing unit 1020 may be configured to output an event anomaly alert upon or after completion of the second phase of deviation detection. The event anomaly alert may be displayed to the user via the user interface 1030, e.g. audibly sounded, and/or visually displayed on a display unit. The event anomaly alert may include data relating to anomaly events detected during the second phase of deviation detection.

Reference is now made to FIG. 2B, which is an illustration of a method for aggregating event anomalies to obtain aggregated anomaly values, according to embodiments of the present subject matter.

Operation 2010 includes receiving a plurality of event anomalies and their associated event anomaly scores, for events that occurred during the baseline time period, in order to perform the event anomaly aggregation phase. Each event anomaly includes a predefined set of parameters and a specified timeframe.

Processing unit 1020 obtains a plurality of event anomalies and parameters of event anomalies. The parameters of event anomalies may include e.g. an associated anomaly event score, for example between 0-100, which may indicate or correlate to an extent or a level of deviation of a parameter's values from a corresponding event deviation baseline model, e.g. as obtained after the second deviation detection phase.

For example, when an event deviation was determined to be deviating or different from an expected behavior (e.g. an expected range of values, or an expected occurrence) based on a corresponding event deviation baseline model, the event may be determined as an event anomaly, and an associated anomaly event score may be calculated. The event anomaly score may correspond to additional attributes, such as, a level of certainty associated with the deviation being an anomaly.

Operation 2020 includes obtaining an analyzed timeframe and an entity. The analyzed timeframe may be bounded by a beginning and an end and may be for example, a day, a week, in which an entity may be referred to. The analyzed timeframe and entity may be determined by a system administrator and/or may be selected automatically, e.g. by processing unit 1020, based on the parameters of the detected event anomalies. The analyzed timeframe may be obtained in accordance to timeframes that may be relevant for identifying suspicious activity of a specified entity. For example, if an entity is a user who logs only during Sundays the timeframe obtained may be a Sunday.

Operation 2030 includes obtaining a context feature set. Upon obtaining the analyzed timeframe and the entity, the processing unit 1020 obtains via the communication channel 1015 a context feature set. Each context feature may be based on at least one parameter derived from an event anomaly and/or associated event anomaly scores.

A context feature set denotes each context feature based on at least one parameter derived from event anomalies and/or their associated event anomaly scores, e.g. as obtained during the second deviation detection phase. For example, an entity may be defined as a mobile device of a certain user. The context feature set may include n features, e.g. $A_1$-$A_n$. $A_1$ may be, for example, the highest event deviation score obtained during March 2014. $A_2$ may be the lowest event deviation score obtained during March 2014. $A_3$ may be an average event deviation score calculated for events that occurred during March 2014, etc.

Operation 2040 includes generating a reduced context feature set from the obtained context feature set. The processing unit 1020 generates a reduced context feature set from the list of context features in order to identify anomaly behavior by activating the context feature reduction phase.

During the context feature reduction phase, the processing unit 1020 calculates a correlation measure between pairs of context features, e.g. for every pair of context features in the context feature set. The correlation measure may be calculated using, e.g., a clustering algorithm, in order to group context features according to similarity within the group.

A correlation measure may be calculated for each pair in various combinations of context features. The processing unit 1020 performs a clustering algorithm (k-mean clustering, for example) to identify groups of context features with high correlation. The processing unit 1020 defines a distance function between any two context features and performs the clustering algorithm to identify groups of context features with high correlation in order to generate a subset of context features with low correlation.

For example, the processing unit 1020 obtains a context feature set which includes 6 context features, $P_1$, $P_2$, $P_3$, $P_4$, $P_5$, $P_6$. $P_1$ may include, for each person and a specified hour, the total amount of parameters deviations which occurred during the specified hour and which are associated with a specified person. $P_2$ may include, for each person and a specified day, the total amount of parameters deviations which occurred during the specified day and which are associated with a specified person as the entity. $P_3$ may include, for each person and a specified month, the total amount of parameters deviations which occurred during a specified month and which are associated with a specified person as the entity. $P_4$ may include, for each location and a specified hour, the total amount of parameter deviations which occurred during the specified hour and which are associated with a specified location as the entity. $P_5$ may include, for each location and a specified day, the total amount of parameter deviations which occurred during the specified day and which are associated with a specified location as the entity. $P_6$ may include, for each location and a specified month, the total amount of parameters deviations which occurred during the specified month and which are associated with a specified location as the entity.

After the correlation measure between the context features has been calculated, several context features, e.g. $P_1$ and $P_2$, are determined to be highly correlated, while the other context feature are determined to have a low correlation. Thus, in one embodiment, a reduced set of context features may include a representative context feature or combination of context features from each group of correlating context features. A first group of correlating context features may include context features $P_1$ and $P_2$. The representative context feature of this group may be, for example, $Q_1$ $(=P_1/P_2)$. The rest of the context features, which were found to be non-correlative, may be included in the reduced subset of context features, e.g. $Q_2=P_3$, $Q_3=P_4$, $Q_4=P_5$, $Q_5=P_6$. Thus, the reduced subset of context features includes only five context features $Q_i$ while $P_1$ and $P_2$ were incorporated into a new context feature $Q_1$.

Operation 2050 includes calculating an aggregated anomaly value per specified entity per specified timeframe, based on the reduced context feature set. Processing unit 1020 may calculate aggregated anomaly values for a specified entity for a specified timeframe. The processing unit 1020 generates an anomaly baseline model representing the anomalies that were determined based on events that occurred during the baseline time period, and an aggregated anomaly value may be calculated per desired entity and per specified timeframe based on the values of the context feature set.

Reference is made to FIG. 3A, which is a schematic illustration of a method for constructing an anomaly baseline model and generating an anomaly alert, according to embodiments of the present subject matter. One or more operations of 310-350 may be included in a third or a final deviation detection phase.

Operation 310 includes receiving a plurality of aggregated anomaly values by the processing unit 1020, in order to perform the third or final deviation detection phase. The event anomalies are event deviations or parameter deviations which occurred during the baseline time period, that are determined to deviate from a corresponding event deviation baseline model. Each aggregated anomaly value may be calculated based on context features associated with a specified entity and a specified timeframe, and stored in the aggregated anomaly values database 1090.

Operation 320 includes constructing an anomaly baseline model. Processing unit 1020 constructs an anomaly baseline model based on a plurality of aggregated anomaly values stored in the aggregated anomaly values database 1090. A pattern of behavior of the plurality of aggregated anomaly values may be represented by the anomaly baseline model. The anomaly baseline model may define the behavior patterns of the aggregated anomaly values, and may enable activating a comparison of new aggregated anomaly values to the anomaly baseline model. The anomaly baseline model may be represented in a graphical manner, e.g. a table, chart, a graph, a diagram, or in a mathematical manner, e.g. as an equation or formulation.

Operation 330 includes receiving new aggregated anomaly values calculated for a specified entity and a specified timeframe. For example, at a specified timeframe, e.g. a certain month of year 2012, and an entity, e.g. a specific mobile device, an aggregated anomaly value may be calculated and may be represented by a single value, e.g. a numerical value that may or may not be within a specified range of values, e.g. an integer or a real number.

Operation 340 includes comparing the new aggregated anomaly values to the anomaly baseline model in order to identify a deviation in the aggregated anomaly values, which is associated with a specified entity and a specified timeframe that indicates suspicious activity associated with the specified entity during the specified timeframe. Processing unit 1020 compares the aggregated anomaly value received via the communication channel 1015 with the anomaly baseline model to define whether the new aggregated anomaly value indicates suspicious activity.

For example, when a new aggregated anomaly value of 13 is received and the anomaly baseline model indicates that the expected range of values for that anomaly type is above 70, for example, 73, 86, 90, it may be determined by processing unit 1020 that the new aggregated anomaly value indicates existence of a suspicious activity, and the entity associated with the parameters that the aggregated anomaly value was calculated based on, during the specified timeframe, requires further examination.

Operation 350 includes generating an alert indicating the suspicious activity detected for the specified entity during the specified timeframe. Processing unit 1020 may be configured to output an alert when the comparison of the final deviation detection phase may be completed. The alert may be displayed to the user via the user interface 1030, e.g. audibly or displayed via a display unit.

The suspicious activity alert may include, e.g., the aggregated anomaly value calculated for the specified timeframe during the final deviation detection phase, as well as the entity and the specified timeframe in which the aggregated anomaly value was obtained. The information regarding the entity and specified timeframe may be necessary in order to obtain additional data regarding the entity and its associated behavior.

Reference is made to FIG. 3B, which is a schematic illustration of a method for generating a reduced context feature set, according to embodiments of the present subject matter. The operations disclosed in FIG. 3B describe the operation 2040 of FIG. 2B in detail.

Operation 3010 includes receiving a context feature set, in order to perform the context feature reduction phase. After acquiring a plurality of event anomalies and event anomaly scores by the processing unit 1020 and obtaining a specified time period and specified entity, a context feature set may be received by the processing unit 1020.

Operation 3020 includes calculating a correlation measure for every pair of context features of the context feature set. The calculation may be performed, for example, by using the Pearson correlation algorithm, Lloyd's algorithm or HCS clustering algorithm, in order to identify groups of context features with high correlation to each other. For every pair of context features, a correlation measure may be calculated, wherein the correlation measure may be a score or value which may reside within a predetermined range of values. In one example, the correlation measure may be within a range between [0-1], wherein 0 indicates a full or maximum correlation, and 1 indicates no correlation between the context features of a pair.

Operation 3030 represent a distance function activated between a pair of context features and may be defined based on the correlation measure, e.g. one minus the correlation measure between the two context features. For example, one context feature represents an average number of a user's logins to a remote computer during a period of time, e.g. weekends, and receives the value '10', while a second context feature may include a maximum number of logins of the same user to the remote computer per day receives the value '11'. These two context features may be defined as highly correlated, e.g. with a value of 0.80, and thus the distance function may value to e.g. 0.20 that is 1-0.80.

Operation 3040 includes performing a clustering algorithm to identify groups of context features with high correlation. The processing unit 1020 may calculate values of each feature in the subset of context features, associated with a specified entity and per a specified timeframe.

Operation 3050 includes generating a subset of context features with low correlation by selecting (e.g. randomly selecting) or determining or calculating a representative context feature based on each context feature group, to create a reduced set of context features. The representative context feature may be a single selected context feature from a group of correlating context features, or a combination of one or more context features from a group of correlating context features. After the subset of context features with low correlation is generated, a representative context feature of each group may be chosen or calculated by the processing unit 1020. Thus, a reduced set of context features is generated based on the representatives of each feature group.

Operation 3060 includes calculating values of each context feature of the subset of context features, per the specified entity and the specified timeframe. The context feature values may be stores, e.g. in a storage unit, e.g. in aggregated anomaly values database 1090.

For example, a context feature of the subset of context features may be a maximum number of occurrences per day in which a certain person logged in to a computerized device at a location outside the organization, e.g. from home or from a different location. The maximum number of occurrences may be calculated for a specified timeframe, e.g. March 2013, and a total value, e.g. 10, may represent daily maximum number of log-ins of these occurrences.

Operation 3070 includes calculating, e.g. by the processing unit 1020, an aggregated anomaly value associated with a specified entity and a specified timeframe, based on values of the context features which are associated with the specified entity and the specified timeframe. There may be various methods to calculate an aggregated anomaly value per a specified entity per a specified timeframe. For example, a set of coefficients $A_1$-$A_n$ may be obtained (e.g. predetermined, or calculated by processing unit 1020), and based on the values $V_1$-$V_n$ of context features $P_1$-$P_n$, a calculation of an aggregated anomaly value may be based on the following equation: $A_1*V_1+A_2*V_2 \ldots A_n*V_n$ and may result with a single value, e.g. 89.

In the context of some embodiments of the present disclosure, by way of example and without limiting, terms such as 'operating' or 'operations' or 'executing' imply also capabilities, such as 'operable' or 'executable', respectively.

The terms 'processing unit' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processing unit' or or 'computer' or derivatives thereof denote an apparatus that is capable of carrying out a provided or an incorporated program and/or is capable of controlling and/or accessing data storage apparatus and/or other apparatus such as input and output ports. The terms 'processing unit' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The process unit and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a computerized device a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A storage unit and/or comprising a program and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized system for recursively detecting anomalies in monitored behavior of entities, the system comprising:
   a storage unit to store monitored events, event deviations and parameters related to each event and to each event deviation;
   a processing unit configured to:
   (1) receive a plurality of input events, each input event comprising a predefined set of parameters,
   (2) construct a plurality of baseline models, each baseline model representing a behavior of at least a subset of parameters of the received input events,
   (3) receive an input event that occurred during an analyzed timeframe,
   (4) compare parameters of the received input event to a corresponding baseline model in order to detect an event deviation,
   (5) associate an event deviation score to the detected event deviation,
   (6) using the detected event deviation as an input event, repeat at least (1)-(5) for each of one or more additional iterations until a predetermined condition relating to a number of detected event deviations is satisfied, the predetermined condition specifying detection of no more than a maximum number of event deviations for a particular designated time period, the one or more additional iterations being operative to reduce the number of detected event deviations relative to a number of detected event deviations in an initial iteration, and
   (7) generate alerts indicating suspicious activity has been detected for a specified entity and a specified timeframe associated with the detected event deviation; and
   a viewer application configured to:
   receive alerts relating to one or more detected event deviations; and
   display said alerts to a user of the viewer application on a display unit.

2. A computerized system for detecting anomalies in monitored behavior of entities, the system comprising:
   a storage unit to store monitored events, event deviations and parameters related to each event and to each event deviation;
   a processing unit configured to:
   receive a plurality of event deviations and associated event deviation scores that were determined for a baseline time period, each event deviation comprising a predefined set of parameters, the event deviations being determined recursively over multiple iterations in which one or more event deviations detected in an initial one of the iterations are used as respective input events to a subsequent one of the iterations, the subsequent iteration being operative to produce a reduced number of detected event deviations relative to a number of detected event deviations in the initial iteration, the iterations continuing until a predetermined condition relating to a number of detected event deviations is satisfied, the predetermined condition specifying detection of no more than a maximum number of event deviations for a particular designated time period,
   construct event deviation baseline models, each event deviation baseline model representing a behavior of a subset of selected parameters of the received event deviations,
   receive an event deviation that occurred during an analyzed timeframe,
   compare parameters of the event deviation to a corresponding event deviation baseline model in order to detect event anomalies, each event anomaly comprising one or more parameters,
   associate an event anomaly score to each detected event anomaly, and
   generate alerts indicating suspicious activity has been detected for a specified entity and a specified timeframe associated with the detected event anomaly; and
   a viewer application configured to receive alerts relating to the detected event anomalies, and to display said alerts to a user of the viewer application on a display unit.

3. The system according to claim 2, wherein the processing unit is further configured to:
   receive a plurality of event anomalies and associated event anomaly scores that were determined for the baseline time period, wherein each event anomaly comprises a predefined set of parameters and a specified timeframe;
   obtain an analyzed timeframe and a specified entity;
   obtain a context feature set comprising a plurality of context features, wherein each context feature is based on at least one parameter derived from the event anomaly;
   generate a reduced feature set from the context feature set;
   calculate an aggregated anomaly value per specified entity per specified timeframe based on the reduced context feature set; and
   generate a set of aggregated anomaly values per specified entity per specified timeframe.

4. The system according to claim 2, wherein the processing unit is further configured to:
   receive a plurality of aggregated anomaly values that were determined during the baseline time period, wherein each aggregated anomaly value is calculated based on context features per a specified timeframe;
   construct an anomaly baseline model;
   receive new aggregated anomaly values calculated for a specified timeframe;
   compare the new aggregated anomaly values to the anomaly baseline model in order to identify an aggregated anomaly value deviation, wherein the aggregated anomaly value deviation comprises an entity and a specified timeframe; and
   generate an alert indicating suspicious activity detected for the specified entity during the specified timeframe.

5. The system according to claim 3, wherein the processing unit is configured to generate said reduced context feature set from the context feature set by:
   calculating a correlation measure for every pair of context features in the context feature set;

defining a distance function between any two context features to determine correlating context features; and
performing clustering algorithm to group correlating context features.

6. The system according to claim 2, wherein the analyzed timeframe is selected from the group consisting of sessions, minutes, hours, days and months.

7. The system according to claim 3, wherein a context feature of the context feature set is calculated based on at least one of following parameters:
a number of events detected during a specified timeframe which include the context feature, a function of the context feature score in the specified timeframe, a number of a distinct occurrences in the specified timeframe, a number of a values measured for the context feature during the specified timeframe, a number of a new values measured for the context feature during the specified timeframe, a parameter type, a correlation measure between the context feature and another context feature, and a score calculated based on a stability over time of context features.

8. The system according to claim 7, wherein a context feature of the context feature set is calculated based on received event data, a level of correlation between two or more context features, and the stability over time of context features.

9. The system according to claim 7, wherein determining a correlation between two or more context features in the context feature set comprises: generating a correlation measure between the two or more context features based on the baseline time period, and determining a strength of the correlation.

10. The system according to claim 5, wherein the processing unit is configured to group correlating context features into clusters by: calculating a distance function based on a correlation measure, and using the distance function to perform a clustering algorithm on the set of context features.

11. A computerized method for detecting anomalies in monitored behavior of entities, the method comprising:
storing monitored events, event deviations and parameters related to each event and to each event deviation;
receiving, by a processing unit, a plurality of event deviations and associated event deviation scores that were determined for a baseline time period, each event deviation comprising a predefined set of parameters, the event deviations being determined recursively over multiple iterations in which one or more event deviations detected in an initial one of the iterations are used as respective input events to a subsequent one of the iterations, the subsequent iteration being operative to produce a reduced number of detected event deviations relative to a number of detected event deviations in the initial iteration, the iterations continuing until a predetermined condition relating to a number of detected event deviations is satisfied, the predetermined condition specifying detection of no more than a maximum number of event deviations for a particular designated time period;
constructing, by the processing unit, event deviation baseline models, each event deviation baseline model representing a behavior of a subset of selected parameters of the received event deviations;
receiving, by the processing unit, an event deviation that occurred during an analyzed timeframe;
comparing, by the processing unit, parameters of the event deviation to a corresponding event deviation baseline model in order to detect event anomalies, each event anomaly comprising one or more parameters;
associating, by the processing unit, an event anomaly score to each detected event anomaly;
generating, by the processing unit, alerts indicating suspicious activity has been detected for an entity and a timeframe associated with the detected event anomaly;
receiving alerts, by a viewer application, relating to the detected event anomalies; and
displaying, by the viewer application, said alerts to a user of the viewer application on a di splay unit.

12. The method according to claim 11, further comprising:
receiving, by the processing unit, a plurality of event anomalies and associated event anomaly scores that were determined for the baseline time period, wherein each anomaly comprises a predefined set of parameters and a specified timeframe;
obtaining, by the processing unit, an analyzed timeframe and a specified entity;
obtaining, by the processing unit, a context feature set comprising a plurality of context features, wherein each context feature is based on at least one parameter derived from the event anomaly;
generating, by the processing unit, a reduced feature set from the context feature set;
calculating, by the processing unit, an aggregated anomaly value per specified entity per specified timeframe based on the reduced context feature set; and
generating, by the processing unit, a set of aggregated anomaly values per entity per timeframe.

13. The method according to claim 11, further comprising:
receiving, by the processing unit, a plurality of aggregated anomaly values that were determined during the baseline time period, wherein each aggregated anomaly value is calculated based on context features per a predetermined timeframe score;
constructing, by the processing unit, an anomaly baseline model;
receiving, by the processing unit, new aggregated anomaly values calculated for a specified timeframe;
comparing, by the processing unit, the new aggregated anomaly values to the anomaly baseline model in order to identifying an aggregated anomaly value deviation, wherein the aggregated anomaly value deviation comprises an entity and a specified timeframe; and
generating, by the processing unit, an alert indicating suspicious activity detected for the specified entity during the specified timeframe.

14. The method according to claim 12, wherein generating said reduced context feature set from the context feature set comprises:
calculating a correlation measure for every pair of context features in the context feature set;
defining a distance function between any two context features; and
performing a clustering algorithm to group correlating context features.

15. The method according to claim 11, further comprising selecting, by the processing unit, the analyzed timeframe from a group consisting of: sessions, minutes, hours, days and months.

16. The method according to claim 12, further comprising calculating a context feature of the context feature set based on at least one of following parameters: a number of events detected during a specified timeframe which include the context feature, a function of the context feature score in the specified timeframe, a number of a distinct occurrences in the specified timeframe, a number of a values measured for the context feature during the specified timeframe, a number of a new values measured for the context feature during the specified timeframe, a parameter type, a correlation measurement between the context feature and another context feature, and a score calculated based on a stability over time of context features.

17. The method according to claim 16, further comprising calculating a context feature of the context feature set based on received event data, a level of correlation between two or more context features, and the stability over time of context features.

18. The method according to claim 14, wherein grouping correlating context features into clusters comprises: calculating a distance function based on a correlation measure, and using the distance function to perform a clustering algorithm on the set of context features.

19. The system according to claim 1, wherein the processing unit is further configured to:
receive a plurality of event anomalies and associated event anomaly scores that were determined for a baseline time period, wherein each event anomaly comprises a predefined set of parameters and a specified timeframe;
obtain an analyzed timeframe and a specified entity;
obtain a context feature set comprising a plurality of context features, wherein each context feature is based on at least one parameter derived from the event anomaly;
generate a reduced feature set from the context feature set;
calculate an aggregated anomaly value per specified entity per specified timeframe based on the reduced context feature set; and
generate a set of aggregated anomaly values per specified entity per specified timeframe.

20. The system according to claim 1, wherein the processing unit is further configured to:
receive a plurality of aggregated anomaly values that were determined during a baseline time period, wherein each aggregated anomaly value is calculated based on context features per a specified timeframe;
construct an anomaly baseline model;
receive new aggregated anomaly values calculated for a specified timeframe;
compare the new aggregated anomaly values to the anomaly baseline model in order to identify an aggregated anomaly value deviation, wherein the aggregated anomaly value deviation comprises an entity and a specified timeframe; and
generate an alert indicating suspicious activity detected for the specified entity during the specified timeframe.

* * * * *